US006874447B1

United States Patent
Kobett (10) Patent No.: US 6,874,447 B1
(45) Date of Patent: Apr. 5, 2005

(54) HUNTING DOG TRAINING COLLAR

(76) Inventor: Kevin Kobett, 9845 State Rte. C, Savannah, MO (US) 64485

( * ) Notice: Subject to any disclaimer, the term of this patent is extended or adjusted under 35 U.S.C. 154(b) by 37 days.

(21) Appl. No.: 10/301,406

(22) Filed: Nov. 21, 2002

Related U.S. Application Data (60) Provisional application No. 60/385,546, filed on Jun. 4, 2002.

(51) Int. Cl.[7] .............................................. A01K 37/00
(52) U.S. Cl. ...................................................... 119/712
(58) Field of Search ................................ 119/712, 720, 119/718, 719, 792, 908, 905

(56) References Cited

U.S. PATENT DOCUMENTS

| | | | |
|---|---|---|---|
| 2,800,104 | A | 7/1957 | Cameron et al. |
| 3,336,530 | A | 8/1967 | Sloan et al. |
| 4,399,432 | A | 8/1983 | Lunn |
| 5,815,077 | A | 9/1998 | Christiansen |
| 5,900,818 | A | 5/1999 | Lemnell |
| 5,923,254 | A | 7/1999 | Brune |
| 5,966,655 | A * | 10/1999 | Hardouin .................... 455/418 |
| 6,019,066 | A * | 2/2000 | Taylor ........................ 119/720 |
| 6,047,664 | A * | 4/2000 | Lyerly ........................ 119/719 |
| 6,058,889 | A * | 5/2000 | Van Curen et al. ......... 119/721 |
| 6,067,018 | A * | 5/2000 | Skelton et al. ........... 340/573.3 |
| 6,069,844 | A | 5/2000 | Williams |
| 6,078,260 | A | 6/2000 | Desch |
| 6,170,439 | B1 | 1/2001 | Duncan |
| 6,263,836 | B1 | 7/2001 | Hollis |
| 6,271,757 | B1 | 8/2001 | Touchton et al. |
| 6,347,476 | B1 | 2/2002 | Cullen et al. |
| 6,360,698 | B1 * | 3/2002 | Stapelfeld et al. .......... 119/720 |
| 6,441,778 | B1 * | 8/2002 | Durst et al. ............. 342/357.07 |
| 6,549,133 | B2 * | 4/2003 | Duncan et al. ........... 340/573.3 |
| 6,591,786 | B1 * | 7/2003 | Davis ......................... 119/719 |
| 6,598,563 | B2 * | 7/2003 | Kim et al. .................. 119/720 |
| 2002/0021219 | A1 | 2/2002 | Edwards |
| 2002/0040689 | A1 | 4/2002 | So |
| 2002/0046713 | A1 * | 4/2002 | Otto ........................... 119/720 |
| 2002/0050249 | A1 * | 5/2002 | Grimsleye t al. ........... 119/721 |
| 2003/0116099 | A1 * | 6/2003 | Kim et al. .................. 119/719 |

* cited by examiner

*Primary Examiner*—Teri P. Luu
*Assistant Examiner*—Jordan Lofdahl
(74) *Attorney, Agent, or Firm*—Bingham McHale, LLP; C. John Brannon; Daniel L. Boots (57) ABSTRACT

A method and apparatus for tracking and controlling a hunting dog, including a remote assembly to be carried by the hunting dog and a handset assembly to be carried by a hunter. The remote assembly includes a power source, an electronic controller electrically connected to the power source, a transceiver in electric communication with the electronic controller and the power source and an annunciator electrically connected to the electronic controller. The handset assembly includes an electronic controller, a interface assembly operationally connected to the electronic controller, a transceiver electrically connected to the electronic controller, and a power source electrically connected to the electronic controller and the transceiver. The transceivers are adapted to wirelessly communicate with each other. The remote assembly is adapted to generate a proximity tone within a predetermined distance of the handset assembly and is adapted to receive commands from the handset assembly. The dog is controlled by associating a pleasing tone with the presence of a hunter and automatically generating a pleasing tone when and only when the dog is within a predetermined distance of the hunter.

19 Claims, 9 Drawing Sheets

HUNTING DOG TRAINING COLLAR

CROSS-REFERENCE TO RELATED APPLICATION

The present application is a utility application based upon Provisional application Ser. No. 60/385,546, filed Jun. 4, 2002.

TECHNICAL FIELD OF THE INVENTION

The present invention relates generally to hunting equipment, and, more particularly, to a method and apparatus for using positive reinforcement to condition a hunting dog to remain near its master.

BACKGROUND OF THE INVENTION

In times past, bird hunting was much easier than it is today. The team of hunter and dog would simply walk the fencerows between crop fields to flush out and hunt birds. However, it has increasingly become the practice of farmers to plant grass in their crop fields. Vast fields of tall grass make it difficult for the hunter and the dog to keep track of each other. When the hunting dog is still, such as when it is on point, finding the dog in tall grass can be like trying to find a needle in a haystack.

It is not much easier for the dog to find the hunter. The dog cannot see more than a few feet in tall grass. The dog's primary senses are hearing and scent, making it difficult for the dog to find a hunter trying to be quiet so as not to scare the birds. Moreover, dogs are pack animals and prefer to remain in contact with other members of their pack. The pack includes the hunter, who in fact takes the role of the alpha dog or dominant pack member. Being alone and cut off from their alpha dog makes an individual hunting dog uncomfortable, and distracts it from its task of spotting birds. Hunting in tall grass makes it all the more difficult for the dog to remain in contact with the rest of the pack, especially when that pack includes a human.

Hunters have tried a number of possible solutions to this problem with to varying degrees of success. One attempted solution to the problem of keeping dogs near the hunter has been to equip the dogs with shock collars that provide a painful electric shock to the dog if the dog exceeds some desired distance from the hunter. The transmitter carried by the hunter is adapted to maintain contact with the collar and to administer an electric shock to the dog in response to receipt of a control signal from the hunter. The shock collar therefore operates upon the principle of punishment to train the dog to stay near its master. These collars suffer from the drawback of using punishment to extinguish certain specific unwanted behaviors by hurting the dog when it engages in those behaviors. The dog is not trained to stay near the master; rather it is trained to not travel away from the master under specific conditions. If conditions vary from those under which the dog was trained, the training becomes less effective and reliable. Further, the use of painful punishment is impractical while actually in the field hunting, since the dog is likely to react to the shocks by yelping or otherwise making noises which may prematurely scare and flush the birds. Moreover, using pain to train any animal can intimidate the animal to the point of ineffectiveness.

Another attempt at a solution is a beeper collar. The beeper collar is worn by the dog, and emits a periodic beeping noise to help the hunter find the dog. The known beeper collars suffer from several drawbacks. First, a beeping collar worn by a dog does nothing to help the dog to actively find its master. Also, the beeping noise can quickly become an annoyance to both the hunter and the dog. Further, the beeping noise may spook the game birds. Finally, extensive long-term use of beeping collars may damage a dog's sensitive hearing.

There is, therefore, a need for a device or system that both enables the hunter to find the dog and the dog to find its master that does not emit a beeping noise that would spook the game birds the hunter and dog are attempting to hunt. The present invention addresses this need.

SUMMARY OF THE INVENTION

The present invention relates to a method and apparatus for enabling a hunting dog and hunter to find one another during a hunting expedition. The apparatus includes a remote speaker unit to be worn by the dog and that produces a feedback signal allowing the dog to home in on the hunter and also produces an audible signal allowing the hunter to know when the dog is near.

One object of the present invention is to provide an improved hunting collar. Related objects and advantages of the present invention will be apparent from the following description.

DETAILED DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The present invention relates to a method and apparatus for training a dog to remain close to its master during a hunting expedition. More particularly, the present invention relates to a system for training and controlling hunting dogs which preferably includes a remote speaker unit to be worn by or attached to a dog and a handset unit to be carried by a hunter. Both are equipped with transceivers and adapted to electronically communicate with each other. The remote speaker unit is preferably attachable to a collar and worn by the dog on or about the neck.

The remote speaker unit is equipped with a speaker adapted to periodically emit sounds, such as tones or beeps, if the dog remains within a predetermined distance from its master. The remote speaker unit is also adapted to emit hawk screams, preferably when the dog exceeds the predetermined range limitation. More preferably the remote speaker unit is equipped to emit hawk screams on demand from the hunter, i.e. when the hunter uses the handset to send a signal to the remote speaker unit actuating a hawk scream.

Still more preferably, the remote speaker unit is adapted to automatically disable the hawk screams if the dog remains motionless, such as when the dog is on point. For example, the remote speaker unit may include a motion actuated switch electronically connected between a power source and a hawk scream generator, such that the hawk scream is enabled when the dog (and hence the remote speaker unit) is moving and is disabled when the dog/remote speaker unit is still.

Preferably, the volume of the sounds generated is variable and can be controlled either by a control on the remote speaker unit, a control on the handset, or both. Still more preferably, the system includes a volume setting where the beeping is audible only to the dog.

The present invention further includes a remote handset or transceiver unit adapted to be carried by the hunter. The remote handset includes a transceiver in electric communication with the transceiver in the dog's remote speaker unit. The handset is preferably adapted to control the actuation range limit of the remote speaker unit, such as setting the range between a predetermined minimum and maximum value, for example twenty-five and four hundred yards. Preferably the range settings are in increments of twenty-five yards, although any convenient range increments may be selected by one of ordinary skill in the art. Preferably, the handset further includes a speaker adapted to sound an alert to the hunter when the dog moves out of range. Still more preferably, the handset includes a non-audible indicator, such as a light or vibration, that may change state from on to off or from off to on when the dog moves out of range. Also, the handset preferably includes an enabling switch to actuate the hawk screams upon demand. As discussed above, the hawk screams may be disabled at the remote speaker unit if the dog is on point or otherwise motionless. Still more preferably the handset includes a range display indicating the present range of the dog from the hunter. Further, the handset preferably includes an "on point" indicator alerting the hunter when the dog is on point (i.e., when the remote speaker unit is not moving). The "on point" indicator is preferably visual, such as a light or readable message on an LCD screen or the like, but may also be any convenient indicator, such as a vibration, and audible tone, or the like.

The remote speaker unit may be adapted to support a shock mechanism capable of delivering a low-current moderate-to-high voltage electric shock to the animal. In this way, the remote speaker unit may combine the concepts of reinforcement and punishment to more quickly extinguish unwanted behaviors from the animal's repertoire. The shock mechanism is likewise in electric communication with the handset, such that it is likewise controlled, either automatically, manually, or both, by the handset. As regarding the hawk scream as discussed above, the remote speaker unit may be further adapted to disable the training mechanisms, including the sound generators and the shock mechanism, while the dog is on point. In other words, a motion actuated switch may be present in the remote speaker unit and electrically connected between the shock mechanism to disable the shock mechanism when the dog is still (i.e., on point) and enable the shock mechanism when the dog is moving (i.e., not on point and straying away from the hunter). Likewise, the normal beeping signal could be disabled by the switch when the dog is on point. Further, a second tone may be enabled by the switch to play only when the dog is on point. The second tone would be a "reward tone" to which the dog is trained to associate with praise. This reward tone may further be associated with a command, such as "stay", such that the dog develops a command association with the tone and the tone then becomes a command in and of itself. Still further, the remote speaker unit may be adapted to send a signal to the handset to enable the "on point" indicator.

Figure 1:
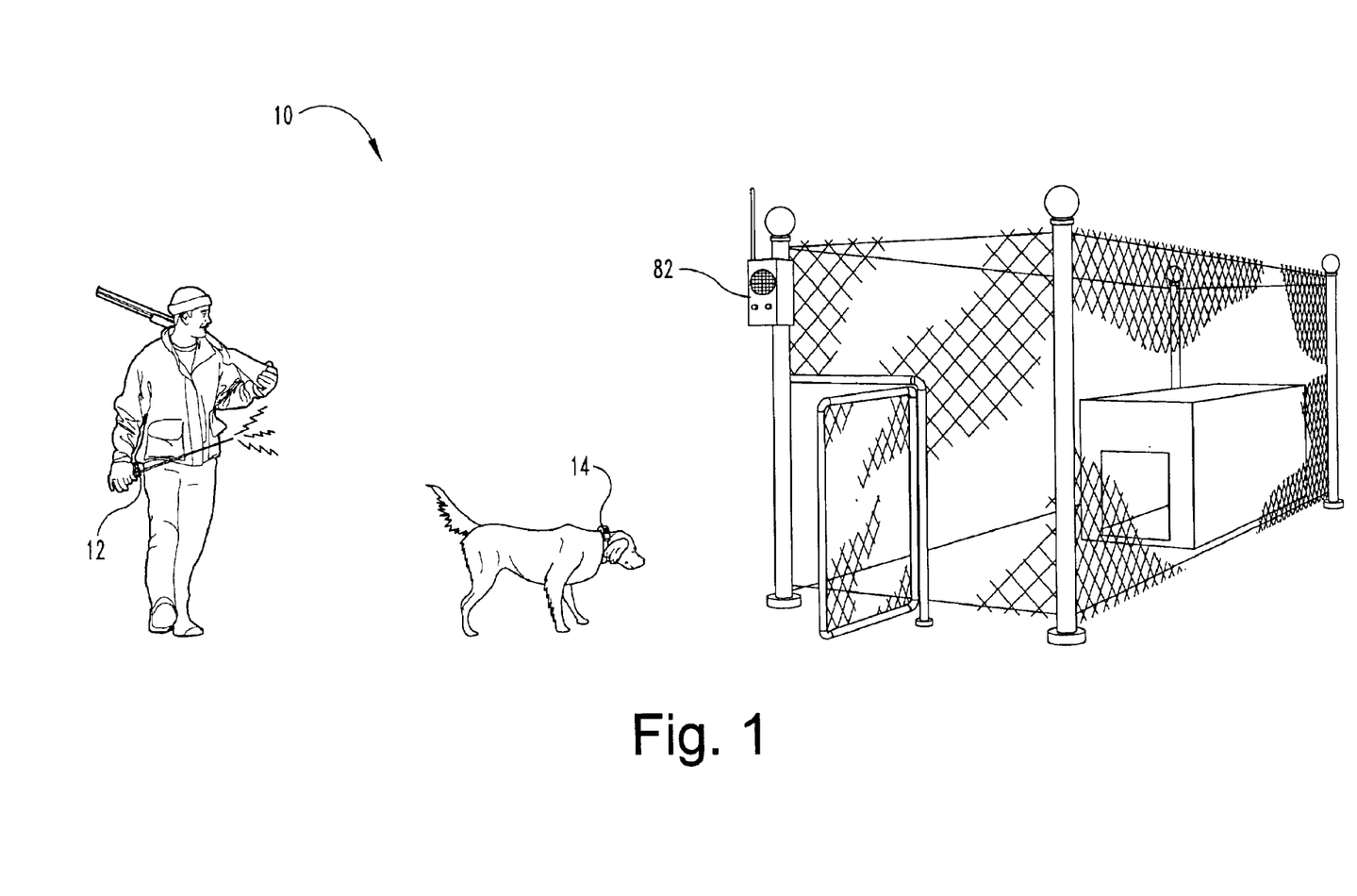
FIG. 1 is a perspective illustration of one embodiment of the system for training and controlling hunting dogs of the present invention.
Figure 2:
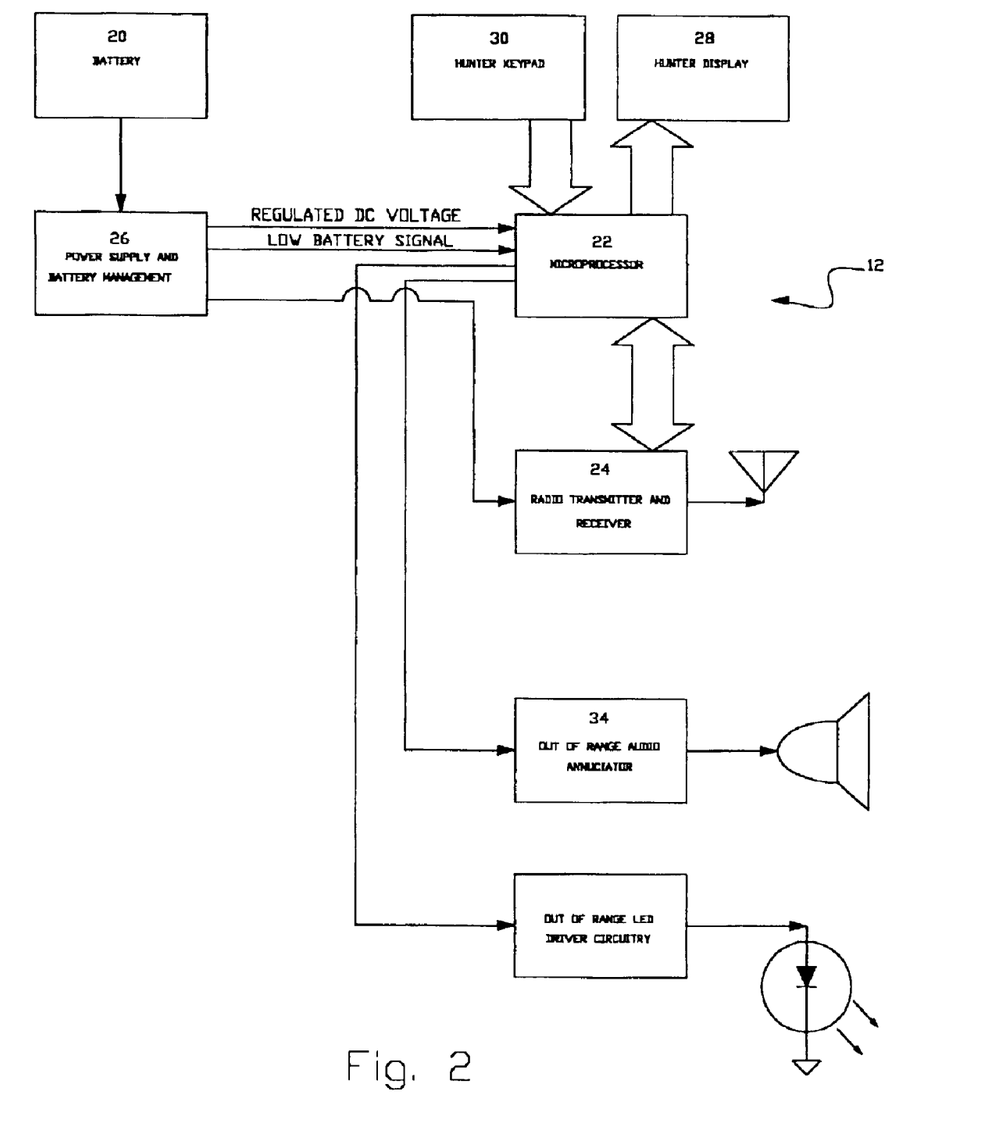
FIG. 2 is a schematic of the handset portion of the embodiment of FIG. 1.
Figure 3A:
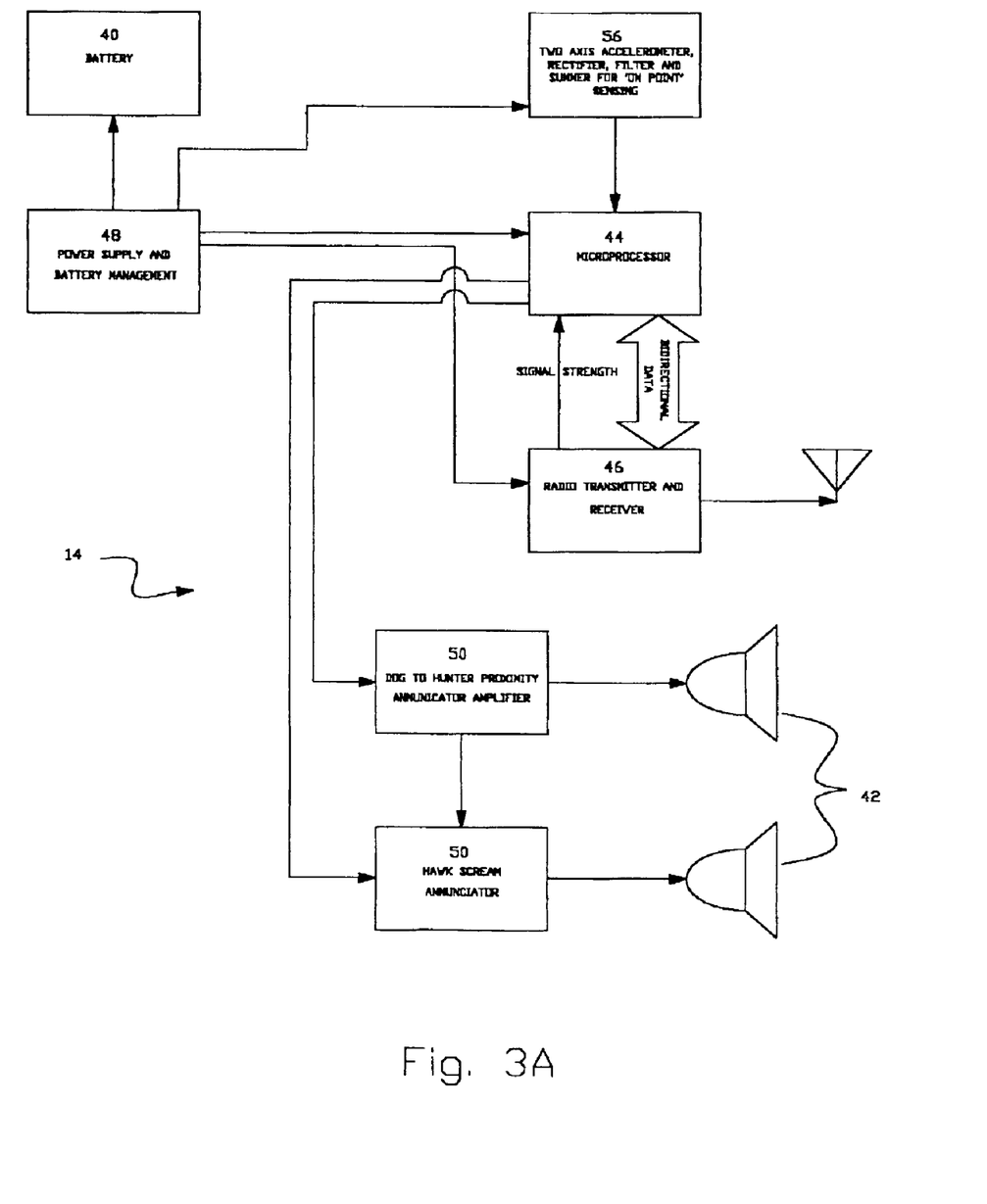
FIG. 3A is a first schematic of the remote unit portion of the embodiment of FIG. 1.
Figure 3B:
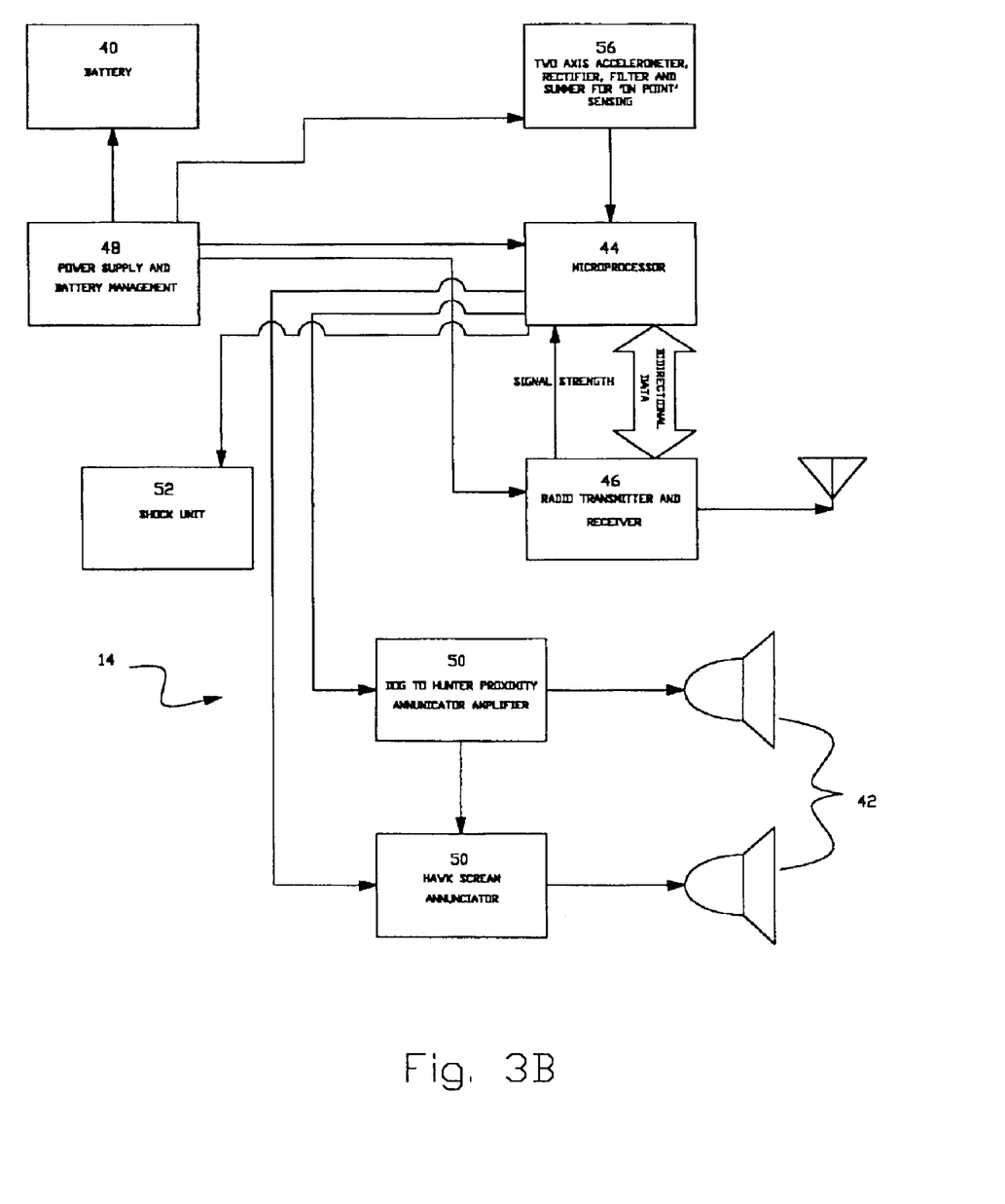
FIG. 3B is a second schematic of the remote unit portion of the embodiment of FIG. 1, including a shock generator.
Figure 3C:
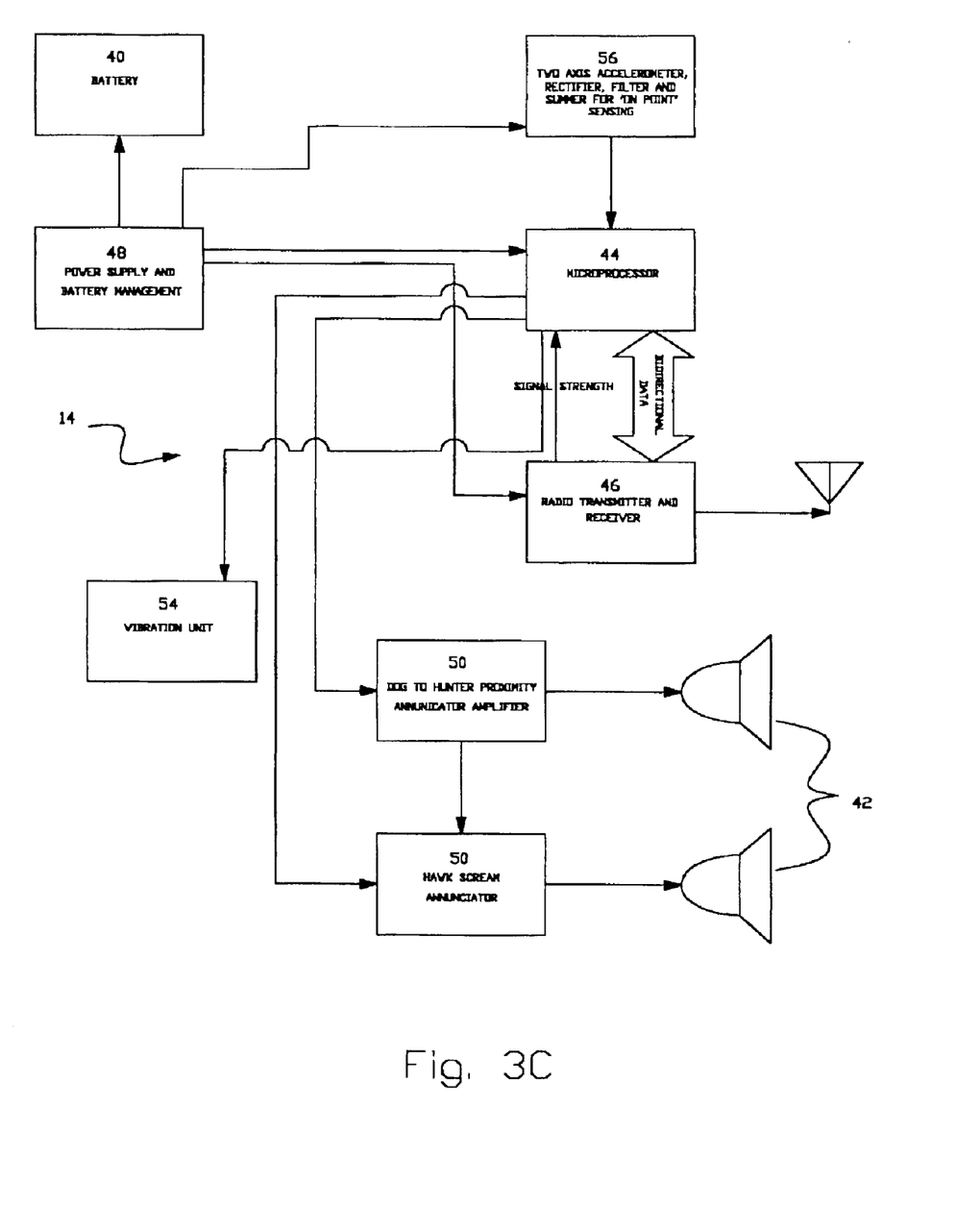
FIG. 3C is a third schematic of the remote unit portion of the embodiment of FIG. 1, including a vibration generator.

The system 10 for training and controlling hunting dogs is illustrated in FIGS. 1–3. FIGS. 2 and 3 schematically illustrate the handset unit 12 and the remote speaker unit 14, respectively. As shown in FIG. 2, the handset unit 12 is powered by a power supply 20 (preferably, a battery and more preferably, a rechargeable battery), controlled by a microprocessor 22 or electronic controller and wirelessly communicates with the remote speaker unit 14 using a transceiver 24. There is preferably a power conditioning and monitoring circuit 26 to provide constant power as battery conditions change and to provide information to the microprocessor 22 about the charge state of the battery 20. The handset unit 12 is programmed by and feeds information back to the user by through an interface assembly 28. The interface assembly 28 preferably includes a keypad 30, a visual display 32 (preferably a liquid crystal display/LCD), audio annunciators 34 and optical indicators 36 (preferably light emitting diodes/LEDs).

The battery 20 is the power source for the handset instrument 12, and is preferably either rechargeable or easily removable. The power management circuitry 26 provides a constant voltage for the circuits. As battery voltage decreases (as energy is pulled from the battery 20), a regulator 26 is preferred such that constant power supply voltage is available for the instrument 12. This power management circuitry 26 may also be employed to monitor the battery voltage or in some other way monitor battery life, so as to send a signal to the microprocessor 22 when the battery power decreases below a predetermined threshold value (i.e., when the battery 20 is near the end of its life). For instance, a 'low battery' icon could be shown to the user when battery power drops below the predetermined threshold. In one embodiment, the predetermined threshold could coincide with a known time left for the instrument 12 to function so that a user would not be put in the position of, for example, having an hour's battery life left when beginning a two-hour session with the hunting dog.

Figure 4:
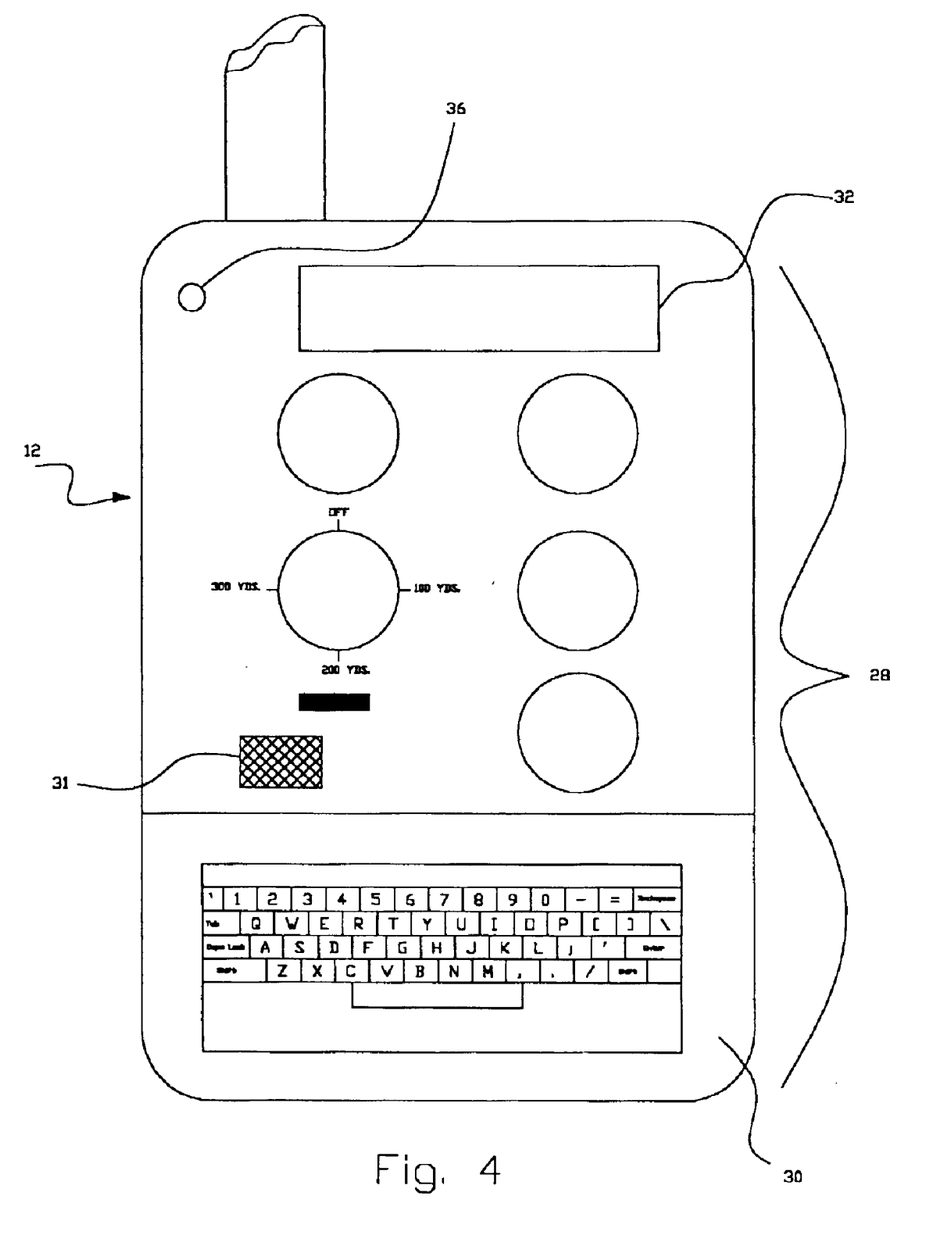
FIG. 4 is a plan view of the interface assembly portion of the embodiment of FIG. 2.

The interface assembly 28 is the mechanism through which the hunter communicates with the system 10 and is shown in greater detail in FIG. 4. Preferably, the interface assembly 28 includes an alphanumeric keypad 30 for inputting commands, such as for programming range, volume, and tone mode actuation parameters. Likewise, for an embodiment including an electric shock option, a button on the keypad 30 could initialize this shock option.

The display 32 may be of any convenient type, such as a liquid crystal display (LCD) screen, a series of light emitting diodes (LEDs), coded lights, or the like. The display 32 is preferably used to show the status of a number of programmable parameters such as the range preset for the tone generation range limit of the remote speaker unit 14. Other preferable feedback signals to the hunter include an indication that the system 10 is either in distance sensitive frequency or distance sensitive loudness mode for the remote speaker annunciation, an indication as to whether the dog is on point or not, the state of the battery power. This list is not inclusive of all of the possible signals that the handset could provide. The interface assembly 28 also preferably includes an audio annunciator 34 that emits a tone when the remote speaker unit 14/dog is out of range and/or an out of range LED driver circuit that lights an optical indicator 36 when the dog is out of range. Alternately, the interface assembly 28 may include a vibration actuator (i.e., an audio actuator 34 generating a substantially inaudible vibratory signal) to give the hunter "silent" feedback in the form of vibrations that are tactilely received.

The handset unit 12 further includes a microprocessor 22 operationally connected in electric communication with the battery 20 and the interface assembly 28. The microprocessor 22 is connected in communication with the keypad 30 and also controls all of the feedback displays 32, 34, 36 on the handset unit 12. The microprocessor 22 also performs all of the calculations required for the handset unit 12, such as calculation of the distance from remote speaker unit 14 to the handset unit 12, a calculation to determine if the dog is on point, field calibration of the RF signal strength that represents a close dog or a dog on point, and the like. For the latter two examples, the microprocessor 22 may be required to measure the real signal and calibrate the result of the measurement (RF signal strength for the proximity measurement or remote unit 14 movement for 'on point' determination) with the parameter of interest (distance and movement).

The handset 12 also includes a transceiver 24 to wirelessly send and receive signals. Preferably, the transceiver 24 operates using radio signals, but may transceive any convenient signal medium, such as infrared, ultrasonic, or the like. The transceiver 24 communicates parameters to the remote speaker unit 14 (such as on/off status, hawk scream, shock, range at which tone or beep generation ceases, maximum range, and the like). The transceiver 24 provides the carrier of the RF transmissions from the handset 12 to the remote speaker unit 14. This carrier signal (or the output of the AGC feedback loop's error amplifier in the remote unit 14) is used to determine the distance between the hunter's handset unit 12 and the remote unit 14 carried by the dog. Alternatively, the hunter's hand held unit 12 could sense the RF field strength from the remote unit 14 to determine distance. Each system 10 will preferably be characterized by a parameter that is unique in the field. This will allow the use of several hunter/dog systems 10 in proximity. Preferably, this is accomplished by provision of a number of uniquely assigned channels offset from a common frequency (like the 'channels' on a home wireless phone). The microprocessor 22 (given input from the keypad 30 or a dedicated channel key) would set system frequency. Likewise, one handset 12 can be used to communicate with and control and number of different remote units 14. Again, each remote unit 14 would be assigned a specific frequency for communication with the handset 12. The handset interface assembly 28 would distinguish each remote unit 14 audibly be using a unique tone or tone pattern for each remote unit 14.

Referring to FIG. 3, the remote speaker unit 14 includes a battery or power source 40, an audio annunciator assembly 42, a microprocessor 44 and a (preferably radio) transceiver 46. The remote speaker unit 14 further includes a power conditioning and monitoring circuit 48 for the provision of constant power as battery conditions change, as well as to provide information to the microprocessor 44 about the state of the battery 40. The remote speaker unit 14 is preferably remotely programmed through commands input into the handset 12 (through the interface assembly 28) and transmitted to the remote unit 14.

The remote speaker unit 14 in turn provides information to the dog through the audio annunciator assembly 42. The audio annunciator assembly 42 preferably includes two independent audio annunciators 50, one for communicating the distance to the hunter and the other to signify that the dog has wandered too far off, although one annunciator 50 could perform both functions. Additionally, other contemplated embodiments include an electric shock unit 52 positioned to provide punishment to the dog in the form of electric shock, a vibration actuator 54 to give the dog non-audible feedback, and the like.

Additionally, there is circuitry to generate a signal to be sent to the handset 12 when the dog in on point. This signal can be used for several purposes including inhibiting the hawk scream and communicating to the hunter (via the RF transmitter/receiver) the fact that the dog is on point. The circuitry is described in more detail below.

The battery 40 is the power source for the remote unit 14 and is similar to the battery 20 described above. Likewise, the power supply/battery management circuitry provides 48 a constant voltage for the circuits in the remote unit 14. As discussed above, battery voltage decreases as energy is pulled from the battery and a regulator 48 is preferred to provide the power supply voltage for the remote unit circuits. This circuitry 48 may also monitor the battery voltage or in some other way monitor battery life to send a signal to the remote unit microprocessor 44 when the battery 40 is low, which is relayed to the handset microprocessor 22 via the transceivers 24, 46 and displayed on the interface assembly 28. Ideally, the power needs of the remote unit 14 would be less that those of the handset 12 and remote unit battery life would match or exceed that of the hunter's handset battery 20.

The audio annunciator assembly 42 preferably generates a tone that emulates a hawk scream when the dog is out of range, i.e., exceeds a predetermined distance from the hunter, although any tone or beeping pattern may be chosen. This tone is preferably inhibited when the remote unit is motionless (i.e., when the dog in on point). Any of these features (scream when out of range, inhibit when dog is on point, etc.) could be programmed and/or manually initiated upon demand by the hunters handset unit 12.

The audio annunciator assembly 42 preferably gives the dog feedback about his position relative to that of the hunter. This may be a baseline beeping or a constant tone that ceases as the dog traverses a perimeter whose distance relative the hunter is programmed by the hunter on his handheld 12 (or is preprogrammed as a preexisting default value). Alternatively, this tone could vary in loudness or frequency as a function of distance from the hunter and could also be based on a maximum distance that the hunter could program at his handset unit 12. Further, the volume of the annunciator assembly 42 preferably may be varied (either automatically or manually) as a function of the ambient noise level experienced by the dog. For example, the volume may be maintained at a low level during relatively quiet conditions, and elevated during relatively noisy conditions, such as when the dog is running, during wind and/or rain, and the like.

The microprocessor 44 is operationally connected in electric communication with the hunter's handset 12 via the transceivers 24, 46 and the dog via motion sensors 56 (see FIG. 4) and the audio annunciator assembly 42. The microprocessor 44 also performs all of the calculations required for the hand unit 12. This might include the calculation of the distance from remote unit 14 to the hand unit 12, proximity audio loudness, proximity audio frequency, determination of the 'on point' status of the dog, etc.

The remote transceiver 46 wirelessly communicates parameters to the hunter's handheld unit 12 (distance, on point status, etc.) and also measures RF field strength that (with the field calibration carried out by the hand held unit) determines distance from the handset transceiver 24. The transceiver center frequency of the transceiver 46 in the remote unit 14 must match that of the transceiver 24 in the hunter's handset unit 12.

The remote unit also preferably includes an "on point" or motion sensor circuit 56. Preferably, the motion sensor circuit 56 (as detailed in FIG. 5) includes a (preferably two-axis) accelerometer 58, a rectifier 60, a filter 62 and a summer 64 operationally connected to each other in electric communication. The outputs of the two-axis accelerometer 58 are rectified, filtered and summed to provide a DC voltage proportional to the movement of the remote unit 14 (and, thus, the dog). These accelerometers 58 are preferably in monolithic integrated circuit form. Preferably, the accelerometers 58 are oriented as a two-axis system (ignoring the gravity axis), but a three-axis system may also be chosen. Likewise, a one-axis accelerometer 58 could also be used. Preferably, the two- or three-axis accelerometers 58 are AC coupled before the rectifier 60 to eliminate any DC terms from the device output (i.e. gravity).

Figure 5:
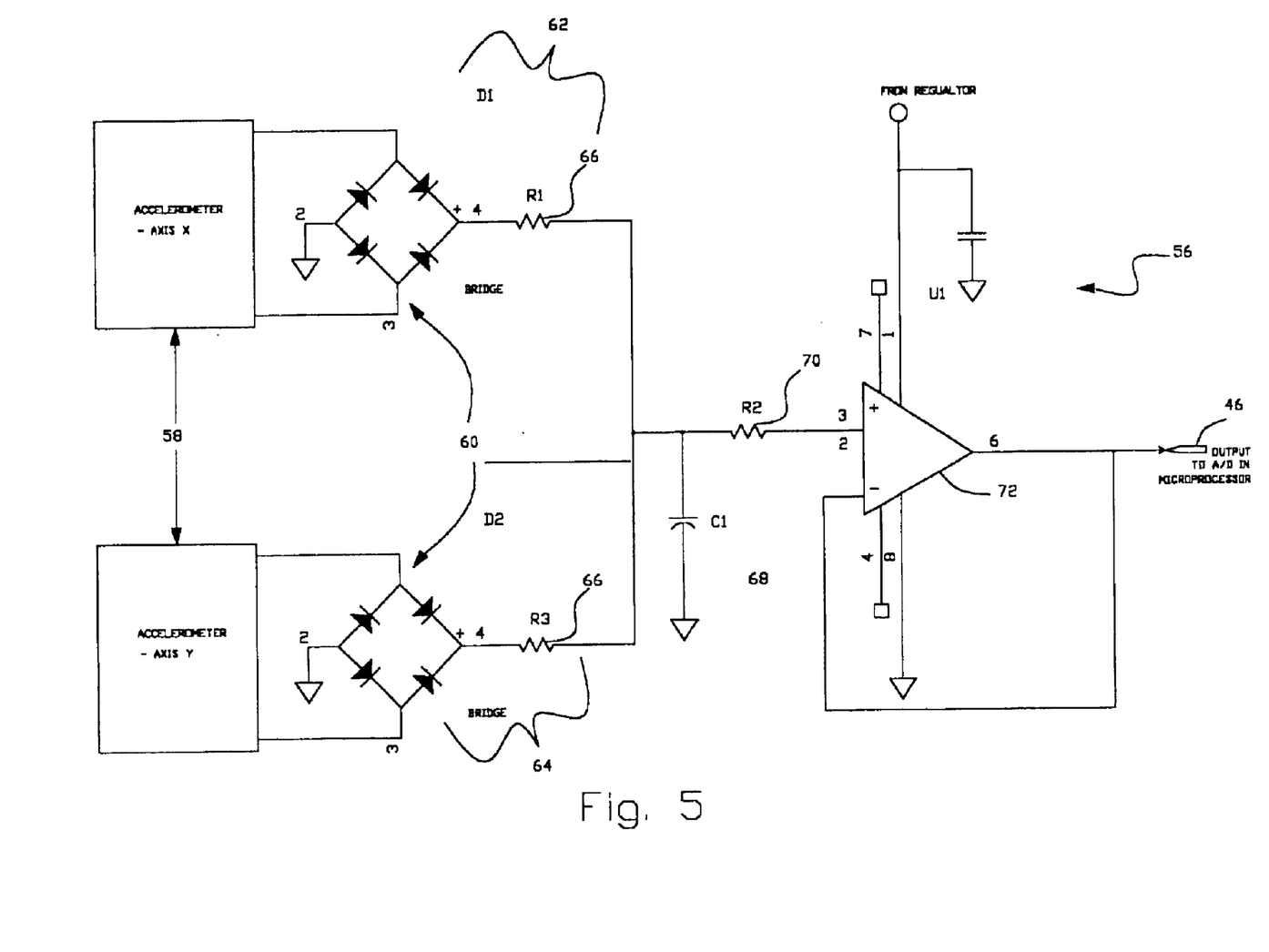
FIG. 5 is a circuit diagram of a motion sensor portion of FIG. 3.

In the preferred embodiment, the accelerometers 58 are monolithic etched silicone devices that (in part) comprise a beam or diaphragm with strain gauges mounted on the flexing surfaces. This beam is free to move in one axis. The strain gauges are electrically arranged as a balanced bridge such that the output of the device 58 is a voltage proportional to the diaphragm's position. The diaphragm is mechanically moves according to the ideal spring equation:

$$F=kx$$

where F is defined to be the force on the diaphragm at any moment, k is defined to be the spring constant, and x is defined to be the diaphragm displacement.
At the same time, the diaphragm is influenced by acceleration in its axis of freedom. This force is:

$$F'=ma$$

where F' is the force on the diaphragm at any moment, m is the mass of the diaphragm, and a is the acceleration of the diaphragm (assumed due to dog movement). Since the diaphragm is constrained in its movement by the spring equation, these two equations must equal each other and the voltage output of the accelerometer 58 is proportional to the displacement of the diaphragm. Since $$x=(m/k)a$$

the voltage output is proportional to acceleration. As mentioned previously, the constant acceleration due to gravity is a term that must be accounted for. It could be not sensed (e.g. do not place an accelerometer 58 in the axis of gravity when the dog is on its feet) or filtered out (AC couple the accelerometer signals prior to rectification).

The rectifier 60 (D1 and D2) take the accelerometer's 58 output voltage and convert it into a pulsed DC output. This eliminates the need for a negative power supply rail on the remote unit 14 and (if filtered) yields a signal proportional to the movement the accelerometers 58 (and hence the dog) are undergoing. Alternately, precision rectifiers 60 could be used that do not suffer the diode drops associated with the circuit shown 56.

The resistors 66 on the rectifier's outputs and the capacitor 68 (C1) form a low pass filter 62 and sun the outputs of the two axis accelerometer 58 (or dual single axis units). This filter 62 outputs a DC voltage proportional to the acceleration of the accelerometers 58 over some time period. The greater the capacitance value of the capacitor 68, the longer it takes the filter to respond and the longer 'back in time' the voltage represents the acceleration of the dog. The circuit 56 as illustrated is simplified; in alternate embodiments, the circuit 56 could be embellished. For instance, the two signals could be RMS added (a linear addition of vectors). Further, sensitivity could be increased at either end of the range of movement for the dog by either compression or expansion of the signal.

A second resistor 70 (R2) isolates the operational amplifier 72 from the capacitance of the filter. The operational amplifier 72 buffers the summed voltage and drives the input impedance of the A/D converter in the microprocessor 46. A constant voltage powers the operational amplifier 72. The power supply and battery management circuit 48 in the remote unit provides this voltage.

In practice, a level of output from this circuit 56 will have to be tolerated even when the dog is on point. For example, the animal's breathing will produce an output. To account for this and other small acceleration-producing factors (such as changing outputs due to temperature variations, wind, etc.) the microprocessor 46 is preferably programmed with a threshold for the "on point" signal. This threshold may be in the form of a predetermined value, or may be calibrated to a specific dog. For instance, the dog could be commanded to lie down and the signal from the motion detector sensed. One could then use this level or some multiple thereof as the trigger point for the 'on point' signal to the remote unit microprocessor 46.

In one alternate configuration, the remote unit 14 is programmed to produce a "stay" tone in response to a signal from the handset 12. The volume of the stay tone may be constant, or may preferably be a function of the signal from the motion sensor circuit, such that the stay tone is produced at a low volume if the remote unit 14 is relatively motionless and a higher volume if the remote unit 14 is moving. In other words, the stay tone is low if the dog is on point, so as not to disturb game birds.

In another alternate configuration, the remote unit 14 includes a sound actuation circuit 80 connected to the microprocessor 46. When the stay tone is actuated by the handset 14, the microprocessor 14 maintains generation of the stay tone until either deactivated by a signal from the handset 12 or a signal is received from the sound actuation circuit 80, such signal generated in response to a noise above a predetermined threshold level. In other words, once activated the stay tone plays until it is either turned off by the hunter via the handset 12 or the hunter generates a loud noise (i.e., fires his gun, claps his hands near the remote unit, or the like). The sound actuation circuit 80 is useful for training the dog to stay until the hunter takes his shot.

In yet another alternate configuration, the remote unit 14 may be programmed to emit both tones and beeps. Preferably, pleasing tones may be generated when the remote unit 14 is within the predetermined proximity limit of the handset 12 (i.e., to let the dog know that it is near the hunter) while relatively harsh or shrill beeps may be generated when the remote unit 14 exceeds the predetermined proximity limit of the handset 12 (i.e., to let the dog know that it is moving away from the hunter and to add "annoyance" incentive for the dog to return to the hunter's proximity). Preferably, the beeping is generated at a substantially louder volume than the tones, since the tones are generated to comfort the dog and the beeping is generated to both annoy the dog and to aid the hunter in locating the dog. More preferably, the beeping may be actuated by a signal from the hunter to locate the dog (alternately, a loud hawk scream noise may be generated for location); more preferably, loud beeping is automatically disabled by the motion sensor circuit 56 signal generated when the remote unit 14 is motionless (i.e., when the dog is on point—the hawk scream function need not be likewise disabled since it encourages game birds to remain motionless). Even more preferably, actuation of the hawk scream function when the dog is on point occurs with increasing volume to emulate the arrival of a hawk from a distance to further encourage game birds to remain still.

Preferably, the entire system 10 is provided in waterproof packaging, such as watertight housings for the handset 12 and remote unit 14, since they will be routinely exposed to wet environmental conditions in the field.

The system 10 further includes a miniature training remote speaker unit device 82, such as a training remote speaker unit or a device attachable to a dog collar, adapted to emit tones or beeps similar or substantially identical to those emitted by the hunting remote speaker unit 14. The training remote speaker device 82 is preferably remotely actuatable. The training remote speaker unit 82 is used to condition the dog to associate the tones with the presence or imminent presence of its master. For example, the hunter may attach the training remote speaker unit 82 to the dog (or dog collar) several weeks before hunting season begins. The hunter may then actuate the training remote speaker unit 82 (by remote control, such as by using the handset 12 or other remote control adapted to actuate the training remote speaker unit 82) when the hunter approaches the dog. Preferably, the hunter actuates the training unit 82 to emit the characteristic tones before the dog is actually aware of the hunter's approach. In this way, the dog is trained to associate the tones of the remote speaker unit with the presence of its master. The tones then become associated with a reward (the presence of the master) and takes on the properties of a reward in and of itself. The system utilizes the principle of positive reinforcement to provide the dog with a reward (the tones) when it engages in a desired behavior (remaining near the master).

Further, the training device 82 may be attached to a kennel wall or the like, such that a number of dogs may be simultaneously trained to associate the beeping tone with the presence of the master. In this way, many dogs could be so trained without the expense of many training collars.

In operation, the training device 82 is used to associate the hunter's presence with a particular noise, such as a pleasing tone. The training device 82 is positioned in a location frequented by the dog or dogs, such as on a dog's collar or in the kennel (see FIG. 1). The hunter activates the training device 82 to generate the pleasing tone prior to his arrival in the dogs' presence. If the training device 82 is mounted on the dog's collar, the handset unit 12 may be used to actuate the training device 82 when the handset 12 is within a predetermined distance and to deactivate the training device 82 when the handset 12 exceeds the predetermined distance from the training device 82. Alternately, the training device 82 may deactivate after a predetermined amount of time has elapse. This is preferably done routinely for several weeks prior to hunting season to train the dog or dogs to associate the pleasing tone with the proximity of the hunter.

The training unit 82 may also be used to train the dog to stay (i.e., cease ambulation) when a second distinct tone is generated (i.e., the "stay tone"). The stay tone can be paired with a spoken command already understood by the dog to indicate a cessation of motion (i.e., "STAY" or the like), paired with an adverse stimulus urging the dog to be still (i.e., a mild shock or the like), or used in a like way to train the dog to stay when the stay tone is played.

Figure 7:
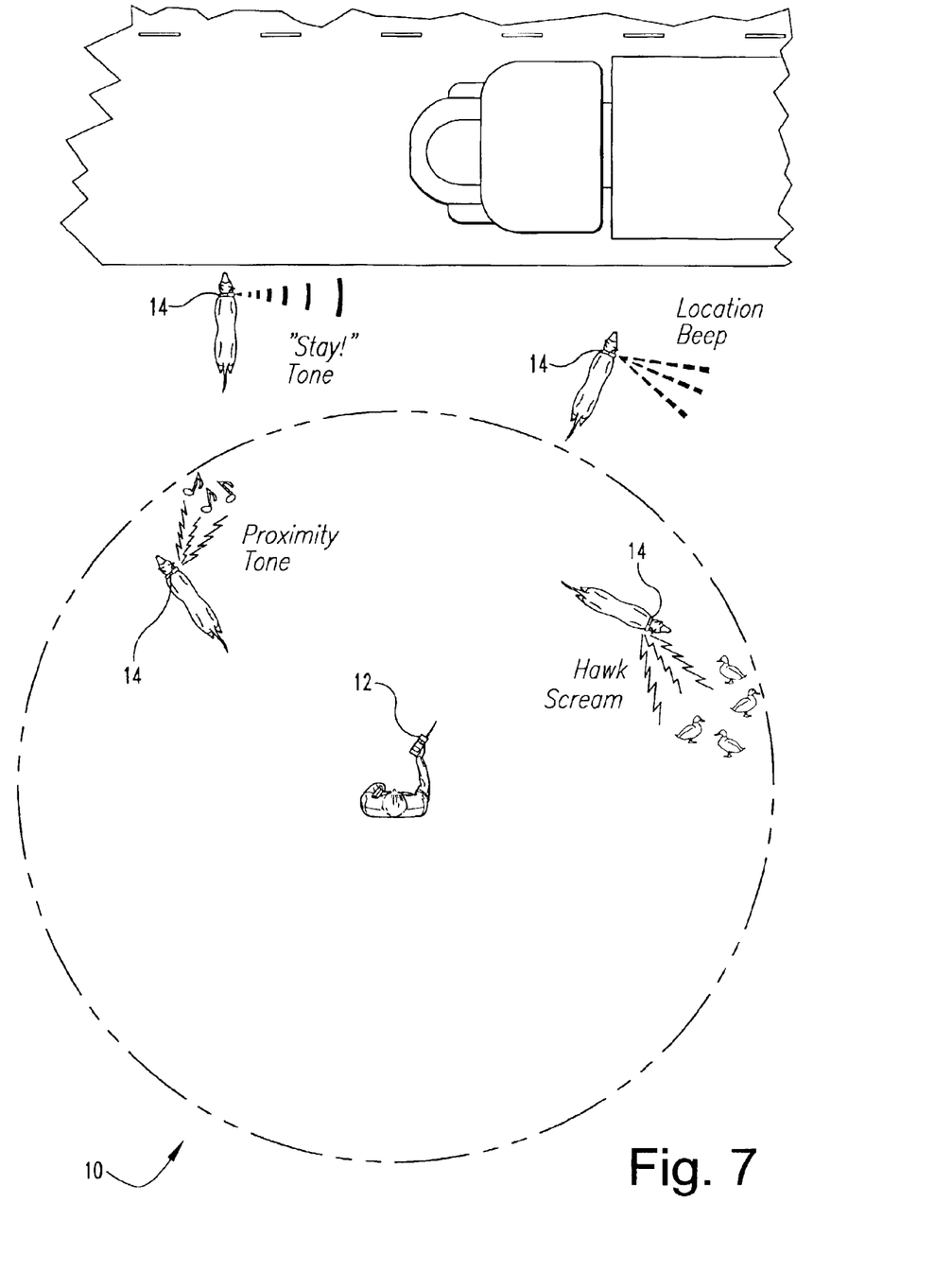
FIG. 7 is a plan view of a hunter and a plurality of dogs using the embodiment of FIG. 1.

In the field, each dog is equipped with a remote unit 14 in radio communication with the hunter's handset 12 (see FIG. 7). The remote unit 14 generates a tone substantially identical to the tone generated by the training unit 82 when the dog is within a predetermined proximity to the handset 12. The proximity may be set by the hunter within the limits of the system 10. When the dog moves outside the predetermined proximity, the pleasing tone ceases. Optionally, a beeping tone or hawk scream sound may be generated by the remote unit 14 to both urge the dog back toward the hunter and alert the hunter to the dog's location. Further, an adverse stimulus may be applied when the dog exceeds the predetermined distance from the hunter parameter. This adverse stimulus may take the form of a shrill tone, a mild shock, or even merely the cessation of the pleasing proximity tone.

If the hunter desires the dog to remain still or "stay", the hunter may use the handset 12 to manually actuate generation of the stay tone by the remote unit 14. This is advantageous if the hunter desires to take a shot and wishes for the dog to remain cease all forward ambulation, useful if the dog is running toward a dangerous environment (such as traffic), simply stay put in its current location, or the like. The stay tone may be actuated in manual mode or, alternately, may remain actuated until deactuated by a loud noise (i.e., "clapper mode").

Figure 6:
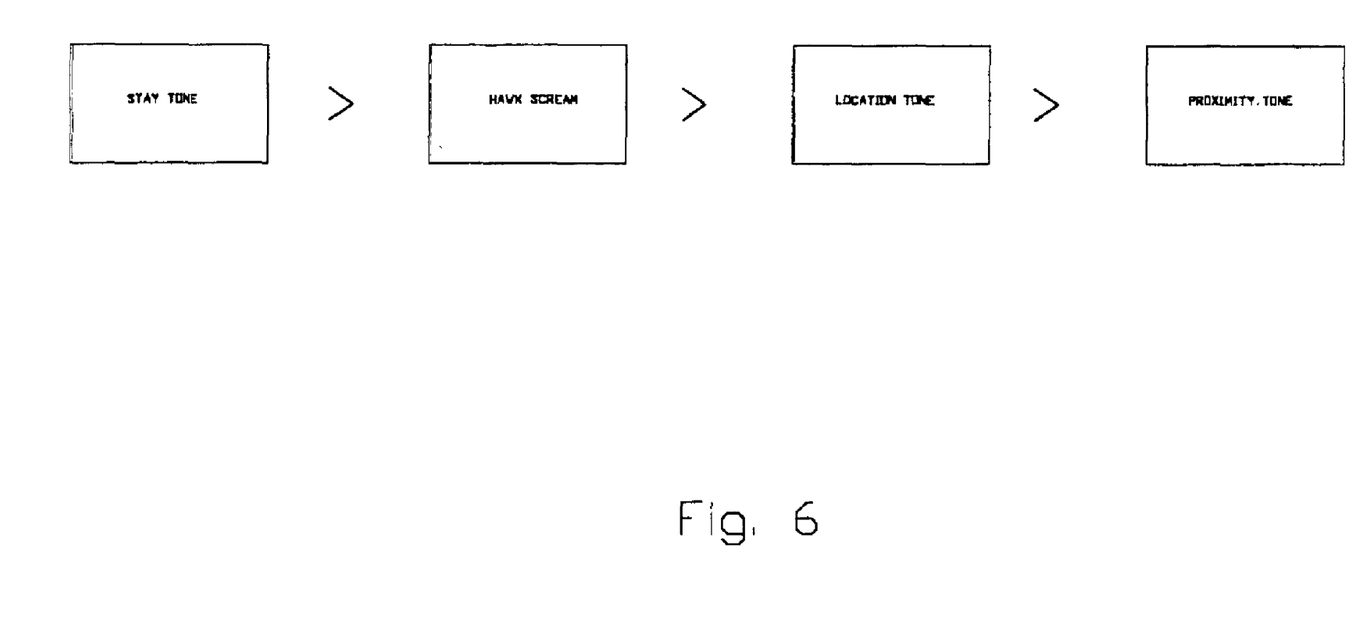
FIG. 6 is a schematic diagram of the hierarchy of tones generated by the embodiment of FIG. 1.

If the hunter wishes to suppress flight of game birds near the dog, the hunter may independently actuate generation of a hawk scream by the remote unit 14. Since hawks are predators of many game birds, the hawk scream urges the game birds to remain still so as to not be noticed by the "hawk". This is useful in situations wherein the hunter desires for game birds to remain still, such as when one bird is flushed by the presence of the dog and the hunter desires for other birds in the vicinity of the dog to not follow suit and flush but instead remain on the ground until the hunter is able to take a shot. The hawk scream may be actuated even when the dog is on point or out of the predetermined proximity (i.e., the hawk scream function overrides the proximity tone and any out-of-proximity sounds—the only function that overrides generation of the hawk scream is the stay tone. This hierarchy is presented as FIG. 6).

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present invention. Accordingly, it is understood that all changes and modifications that come within the spirit of the invention are desired to be protected.

What is claimed is:

1. A system for tracking and controlling a hunting dog, comprising:
   a stationary pleasing proximity tone generator;
   a remote assembly to be carried by the hunting dog, further comprising:
      a remote power source;
      a remote electronic controller electrically connected to the remote power source;
      a remote transceiver in electric communication with the electronic controller and the remote power source; and
      at least one remote annunciator electrically connected to the electronic controller;
   a handset assembly to be carried by a hunter, further comprising:
      a handset electronic controller;
      an interface assembly operationally connected to the handset electronic controller;
      a handset transceiver electrically connected to the handset electronic controller; and
      a handset power source electrically connected to the handset electronic controller and the handset transceiver;
   wherein the remote transceiver and the handset transceiver are adapted to wirelessly communicate with each other;
   wherein the remote assembly is adapted to generate the pleasing proximity tone within a predetermined distance of the handset assembly;
   wherein the dog has been conditioned via the stationary pleasing proximity tone generator to associate the pleasing proximity tone with the presence of the hunter; and
   wherein the remote assembly is adapted to receive commands from the handset assembly.

2. The system of claim 1 wherein the remote transceiver and the handset transceivers transceive radio signals.

3. The system of claim 1 wherein the remote power source and the handset power source are rechargeable batteries.

4. The system of claim 1 wherein the interface assembly further comprises:
   at least one handset annunciator; and
   a visual display.

5. The system of claim 4 wherein the visual display is a liquid crystal display screen.

6. The system of claim 4 wherein the at least one handset annunciator is adapted to generate a substantially inaudible vibratory signal.

7. The system of claim 1 wherein the at least one remote annunciator further comprises a first remote annunciator and a second remote annunciator.

8. A system for tracking and controlling a hunting dog, comprising:
   a remote assembly to be carried by the hunting dog, further comprising:
      a remote power source;
      a remote electronic controller electrically connected to the remote power source;
      a remote transceiver in electric communication with the electronic controller and the remote power source; and
      at least one remote annunciator electrically connected to the electronic controller;
   a handset assembly to be carried by a hunter, further comprising:
      a handset electronic controller;
      an interface assembly operationally connected to the handset electronic controller;
      a handset transceiver electrically connected to the handset electronic controller; and
      a handset power source electrically connected to the handset electronic controller and the handset transceiver;
   wherein the remote transceiver and the handset transceiver are adapted to wirelessly communicate with each other;
   wherein the remote assembly is adapted to generate a pleasing proximity tone within a predetermined distance of the handset assembly;
   wherein the dog has been conditioned to associate the pleasing proximity tone with the presence of the hunter; and
   wherein the remote assembly is adapted to receive commands from the handset assembly; and
   wherein the first remote annunciator is adapted to generate a substantially audible signal and the second remote annunciator is adapted to generate a substantially inaudible vibratory signal.

9. A system for tracking and controlling a hunting dog, comprising:
   a remote assembly to be carried by the hunting dog, further comprising:
      a remote power source;
      a remote electronic controller electrically connected to the remote power source;
      a remote transceiver in electric communication with the electronic controller and the remote power source; and
      at least one remote annunciator electrically connected to the electronic controller;
   a handset assembly to be carried by a hunter, further comprising:
      a handset electronic controller;
      an interface assembly operationally connected to the handset electronic controller;
      a handset transceiver electrically connected to the handset electronic controller; and
      a handset power source electrically connected to the handset electronic controller and the handset transceiver;
   wherein the remote transceiver and the handset transceiver are adapted to wirelessly communicate with each other;
   wherein the remote assembly is adapted to generate a pleasing proximity tone within a predetermined distance of the handset assembly;
   wherein the dog has been conditioned to associate the pleasing proximity tone with the presence of the hunter; and
   wherein the remote assembly is adapted to receive commands from the handset assembly;
   wherein the remote assembly further comprises a motion sensor electrically connected to the remote electronic controller;
   wherein the motion sensor produces a first motion signal when the remote assembly is moving and a second motion signal when the remote assembly is substantially still; and wherein the electronic controller at least partially suppresses tone generation when receiving the second motion signal from the motion sensor.

10. The system of claim 7 wherein the remote assembly is adapted to generate an out-of proximity tone outside a predetermined distance of the handset assembly; wherein the remote assembly is adapted to generate a stay tone in response to a stay signal from the handset.

11. A system for tracking and controlling a hunting dog, comprising:
   a remote assembly to be carried by the hunting dog, further comprising:
      a remote power source;
      a remote electronic controller electrically connected to the remote power source;
      a remote transceiver in electric communication with the electronic controller and the remote power source; and
      at least one remote annunciator electrically connected to the electronic controller;
   a handset assembly to be carried by a hunter, further comprising:
      a handset electronic controller;
      an interface assembly operationally connected to the handset electronic controller;
      a handset transceiver electrically connected to the handset electronic controller; and
      a handset power source electrically connected to the handset electronic controller and the handset transceiver;
   wherein the remote transceiver and the handset transceiver are adapted to wirelessly communicate with each other;
   wherein the remote assembly is adapted to generate a pleasing proximity tone within a predetermined distance of the handset assembly;
   wherein the dog has been conditioned to associate the pleasing proximity tone with the presence of the hunter;
   wherein the remote assembly is adapted to receive commands from the handset assembly;
   wherein the at least one remote annunciator further comprises a first remote annunciator and a second remote annunciator the remote assembly further comprises a motion sensor electrically connected to the remote electronic controller;
   wherein the remote assembly is adapted to generate an out-of proximity tone outside a predetermined distance of the handset assembly;
   wherein the remote assembly is adapted to generate a stay tone in response to a stay signal from the handset;
   wherein the motion sensor produces a first motion signal when the remote assembly is moving and a second motion signal when the remote assembly is substantially still; and
   wherein the electronic controller at least partially suppresses proximity tone generation, out-of-proximity tone generation and stay tone generation when receiving the second motion signal from the motion sensor.

12. The system of claim 1 wherein the remote unit is adapted to generate a plurality of distinct tones and wherein the handset is adapted to selectively actuate the plurality of distinct tones.

13. A system for tracking and controlling a hunting dog, comprising:
   a remote assembly to be carried by the hunting dog, further comprising:
      a remote power source;
      a remote electronic controller electrically connected to the remote power source;
      a remote transceiver in electric communication with the electronic controller and the remote power source; and
      at least one remote annunciator electrically connected to the electronic controller;
   a handset assembly to be carried by a hunter, further comprising:
      a handset electronic controller;
      an interface assembly operationally connected to the handset electronic controller;
      a handset transceiver electrically connected to the handset electronic controller; and
      a handset power source electrically connected to the handset electronic controller and the handset transceiver;
   wherein the remote transceiver and the handset transceiver are adapted to wirelessly communicate with each other;
   wherein the remote assembly is adapted to generate a pleasing proximity tone within a predetermined distance of the handset assembly;
   wherein the dog has been conditioned to associate the pleasing proximity tone with the presence of the hunter; and
   wherein the remote assembly is adapted to receive commands from the handset assembly;
   wherein the remote unit is adapted to generate a plurality of distinct tones and wherein the handset is adapted to selectively actuate the plurality of distinct tones;
   wherein the plurality of distinct tones further comprises a stay tone, a hawk scream, an out-of-proximity beep, and a proximity tone;
   wherein the tones are assigned a hierarchy of importance recognized by the remote microprocessor;
   wherein the stay tone is assigned the most importance;
   wherein the hawk scream is assigned the next most importance;
   wherein the proximity tone is assigned the least importance; and
   wherein the microprocessor may not actuate a distinct tone if a more important distinct tone is being generated.

14. The system of claim 1 further comprising a training device, wherein the training device further comprises:
   a training power source;
   a proximity tone generator operationally connected to the training power source; and
   an actuator operationally connected between the training power source and the proximity tone generator;
   wherein the proximity tone generator is adapted to generate a proximity tone.

15. The system of claim 14 wherein the actuator further comprises:
   a training microprocessor electrically connected to the training power source; and
   a training transceiver operationally connected to the microprocessor and electrically connected to the training power source;
   wherein the training transceiver is adapted to wirelessly communicate with the handset transceiver; and
   wherein the handset transceiver is adapted to actuate the training proximity tone generator to generate a proximity tone.

16. The system of claim 14 wherein the actuator further comprises a mechanical on/off switch.

17. A hunting dog training system, comprising:
a stationary pleasing proximity tone generator;
a collar assembly, further comprising:
   a dog collar;
   an electronic controller connected to the dog collar;
   a remote transceiver connected to the dog collar in electric communication with the electronic controller;
   a microphone connected to the dog collar and connected in electric communication with the electronic controller remote transceiver; and
   a speaker connected to the dog collar and connected in electric communication with the electronic controller; and
a handset transceiver in wireless communication with the remote transceiver;
wherein the handset transceiver is adapted to transmit control signals to the remote transceiver;
wherein the electronic controller is adapted to actuate the speaker to emit the positively reinforcing pleasant continuous stay tone upon receipt from a control signal from the handset transceiver; and
wherein the electronic controller is adapted to deactuate the stay tone in response to a signal from the microphone generated by a noise of predetermined volume.

18. A hunting dog training system, comprising:
a stationary pleasing proximity tone generator;
a collar assembly, further comprising:
   a dog collar;
   a remote electronic controller connected to the dog collar;
   a remote transceiver connected to the dog collar in electric communication with the remote electronic controller; and
   a motion sensor connected to the dog collar and electrically connected to the remote electronic controller;
a handset assembly further comprising:
   a handset electronic controller;
   a handset transceiver in electric communication with the handset electronic controller and in wireless communication with the remote transceiver;
   a display in electric communication with the handset electronic controller;
wherein the handset transceiver is adapted to display an on-point signal when the motion sensor is substantially stationary; and
wherein the handset transceiver is adapted to transmit control signals to the remote transceiver.

19. The system of claim 18 wherein the collar assembly further comprises a speaker connected to the dog collar and connected in electric communication with the remote electronic controller and wherein the speaker is adapted to emit tones when the collar assembly is moving within a predetermined distance from the handset transceiver.

* * * * *